Patented Jan. 13, 1942

2,270,165

UNITED STATES PATENT OFFICE 2,270,165

CATALYST

Herbert P. A. Groll, Berkeley, and James Burgin, Oakland, Calif., assignors to Shell Development Company, San Francisco, Calif., a corporation of Delaware No Drawing. Application December 29, 1937, Serial No. 182,244

9 Claims. (Cl. 252—210)

This invention relates to novel catalysts.

An object of the invention is to provide a solid catalytic material which is suitable for use in a wide variety of processes involving the catalytic reaction or treatment of chemical materials, particularly organic compounds.

The catalysts of the invention are solid compound catalysts essentially consisting of an activated alumina and a catalytically active metal or metal compound, with the former preferably predominating over the latter gravimetrically, and with the metal and/or metal compound incorporated in the surface of the activated alumina. Such solid compound catalysts possess the desired catalytic activity of the metal or metal compound intimately coupled with the desired physical structure and "ultra-porosity" of the activated alumina.

An activated alumina is an essential constituent of the compound catalysts of the invention. Ordinary (unactivated) alumina is to be distinguished from the activated aluminas herein described and specified as an essential constituent of the catalysts of the invention. Ordinary aluminum oxides cannot be employed in lieu of an activated alumina in the compound catalysts of the invention because they do not possess the catalytic activity or the physical structure and surface characteristics of an activated alumina. For the same reason, the customarily used catalyst supports and carriers such as pumice, porcelain, clay, brick screenings, etc., are not equivalents of an activated alumina in the preparation of the compound catalysts of the invention.

The term "activated alumina" is used herein and in the appended claims to designate an aluminum oxide which is characterized by possessing the physical structure and surface characteristics of the "activated alumina" of commerce. "Activated alumina" is a well-known and readily available material. It has been prepared and sold in this country since about 1930, being recommended and used for the adsorption of gases and vapors from gaseous mixtures. "Activated alumina" has been so named because of its active adsorption properties, and not because of any catalyst activity.

As is known to the art, an activated alumina having the physical structure and active adsorption properties (surface characteristics) of "activated alumina" can be prepared in a variety of suitable manners. U. S. Patents 1,868,869 and 2,015,593 each describe different methods for the production of such an activated alumina. A particularly suitable activated alumina is obtained in accordance with the process of U. S. Patent 1,868,869 which comprises subjecting to calcination at a temperature of from 300° C. to 800° C., the deposit or scale which forms in the precipitation tanks and discharge pipes used in the execution of the Fickes-Sherwin modification of the Bayer process. A suitable activated alumina may also be prepared conveniently by precipitating aluminum hydroxide from an aqueous sodium aluminate solution by passing slowly thereinto a stream of gaseous carbon dioxide, and drying the precipitate by heating in air at about 600° C. Another suitable method of preparing an activated alumina consists in treating aluminum amalgam under water and calcining the resulting fibrous aluminum hydroxide as described in K. A. Hofman's "Lehrbuch der Anorganischen Chemie," 6th edition, page 483.

The fundamental difference between an activated alumina and an ordinary alumina is that the former possesses active vapor adsorption characteristics which are not possessed to any appreciable extent, if at all, by the latter. Furthermore, an activated alumina is in itself an active dehydrogenation and hydrogenation catalyst, while an ordinary alumina is almost entirely inactive in these respects. Tests have shown that an ordinary aluminum oxide, such as an alumina prepared from aluminum hydroxide by the ordinary methods, has no adsorptive properties and no activity as a dehydrogenation catalyst. At a temperature of about 600° C., at which temperature an activated alumina is an active dehydrogenation catalyst, ordinary alumina was almost totally inactive. At higher temperatures the use of ordinary alumina as a dehydrogenation inducing agent results in extensive cracking, the reaction and the low ratio of the desired olefine to total olefines in the product being about the same as are obtained with an empty tube or by the use of other contact materials of no catalytic value such as pumice, quartz chips, porcelain, etc.

The catalysts of the invention essentially consist of an activated alumina and at least one metal or compound of a metal selected from a group of metals which is hereinafter described in detail, with the former preferably, but not necessarily, predominating gravimetrically over the latter, and with the metal and/or metal compound incorporated in the surface of the activated alumina. In some cases, the metal and/or metal compound which is incorporated in the surface is in whole or in part in chemical combination with the activated alumina or the surface thereof. In other cases, the metal and/or metal compound may be merely physically adherent to the surface or deposited in some of the pores of the activated alumina. In still other cases, one or more metal and/or metal compounds may be in chemical combination with the activated alumina on the surface thereof while one or more metals and/or metal compounds is physically adherent to the surface and/or deposited in some of the pores of the activated alumina. The expression "incorporated in the surface of the activated alumina" as used herein and in the appended claims is intended to cover the above as well as other cases.

The metal or metal compound which is incorporated in the surface of the activated alumina to result in the compound catalysts of the invention is a metal or a compound of a metal selected from the group consisting of chromium, manganese, vanadium, titanium and scandium. It is necessary that at least one of the above-listed metals or a compound of such a metal be comprised in the compound catalysts. The metal selected from the preferred group may be present in the catalyst as the metal per se or in the form of one or more compounds such as an oxide, hydroxide, sulphide, selenide, telluride, phosphate, manganate, molybdate, tungstate, chromate, bichromate and the like. It will be noted that the members of the preferred group of metals are included in the transition series of the periodic table, and are known to have variable valence.

The catalysts of the invention consists of those consisting of an activated alumina and a metal or compound of a metal of the first transition series of the periodic table which has an atomic number less than 26. The metals of the first transition series which have an atomic number less than 26 are scandium, titanium, vanadium, chromium and manganese.

A preferred subgroup of compound catalysts, which catalysts are adapted to use with excellent results in a wide variety of catalytic operations and are excellent catalysts for hydrogenation and dehydrogenation reactions, embraces those consisting of an activated alumina and at least one chromium compound incorporated in the surface of the activated alumina. The chromium may be present in the compound catalyst in any chemical combination, either in a positive or negative state. For example, the chromium may be present in any one or a plurality of compounds such as $Cr(OH)_2$, $Cr(OH)_3$, $CrO$, $CrO_3$, $Cr_2O_3$, $CrO_2$, $CrS$, $Cr_2S_3$, $Cr_3S_4$, $CrCl_3$, $Cr_2(SO_4)_3$, $Cr(NO_3)_2$, $Na_2CrO_4$, $K_2CrO_4$, $Na_2Cr_2O_7$, $K_2Cr_2O_7$, $Cr_2(CrO_4)_3$, $FeO-Cr_2O_3$, $Al_2(CrO_4)_3$, and the like. Besides one or more chromium compounds, one or more metals of the above listed group or compounds of said metals may be present in the catalyst and incorporated in the surface of the activated alumina.

The invention is not restricted as regards the relative amounts of the activated alumina and the catalytically active material or materials present in the compound catalysts. The optimum concentrations of the essential constituents of the compound catalysts will generally depend upon the particular constituents, upon the method of preparation of the particular catalyst, upon the use to which the catalyst is to be put, and upon the particular conditions under which the catalyst is to be used. For most uses, it is desirable that the activated alumina be in substantial gravimetric excess or the active metal, metals and/or metal compound or compounds in the compound catalyst mass. Suitable catalysts are those containing from about 60% to about 99.5% by weight of an activated alumina and from about 0.5% to about 40% by weight of the active metal and/or metal compound. In some cases, the catalysts may contain greater or lesser amounts of the activated alumina and still be effective for many purposes. Concentrations greater than about 10% may, in some cases, such as when high space velocities are to be used, or when the conversion per pass and the catalyst stability are factors to be considered, be preferred even though the catalyst may have its optimum activity with a lower concentration. Catalysts particularly suitable in processes involving catalytic dehydrogenation or hydrogenation are those containing up to about 10% of the catalyst mass of the active metal, active metal compound or mixture of metals and/or metal compounds. This is especially the case when the compound catalyst comprises one or more chromium compounds.

It is known that many compounds have, in a particular process, a variable activity depending upon the concentration of one of the active constituents in the catalyst, and, that if, other conditions being the same, catalyst activity is plotted against the concentration of said active constituent in the catalyst, the resulting curve will show a definite maximum. We have observed that many of our compound catalysts also have, under a given set of conditions, maximum activity when the active metal or metal compound is present in a certain critical amount. Although we may employ for a particular purpose those catalysts wherein the constituents are present in such amount that the catalyst has maximum activity, this is not necessary. In many cases, it is from practical or economical considerations more advantageous to employ catalysts containing more or less than the optimum concentration of the active metal or metal compound.

The herein described compound catalysts of the desired composition are prepared in a simple, practical and economical manner. For example, the catalyst may be prepared by contacting an activated alumina in the desired solid form, such as granules or pellets of the requisite size, with a solution, preferably but not essentially an aqueous solution, of the metal which it is desired shall be present per se or in a compound in the finished catalyst, allowing the activated alumina and the solution of the metal compound to remain in contact for a time sufficient to permit the desired impregnation, and then separating and drying the impregnated activated alumina, and then subjecting it to a further conversion treatment if the compound with which the activated alumina is impregnated is not the compound desired as a constituent of the finished catalyst.

A convenient method which is applicable to the production of many of the novel catalysts comprises heating the activated alumina under a substantially reduced pressure at a temperature of from about 100° C. to 500° C. (preferably at about 300° C.) for a period of time sufficient to remove substantially all of the air from the pores thereof, allowing the material to cool to about room temperature, and then immersing it in the impregnating solution while it is still under reduced pressure. The solid material may then be separated by filtration or some other suitable method, dried and subjected to a conversion treatment if necessary or desirable. If desired, impregnation of the activated alumina may, in some cases, be accomplished by covering it with the impregnating solution and alternately heating and cooling, or the mixture may simply be allowed to stand until the desired extent of impregnation is effected.

The concentration of the impregnating solution will depend to a certain extent upon the solubility of the particular metal compound employed and upon the desired constitution of the resulting compound catalyst.

The procedure to be followed in drying and/or subsequently treating the impregnated activated alumina will vary depending upon the particular catalyst prepared. The catalyst material may in general be dried in air at temperatures as high as 850° C. In some cases, even higher drying temperatures may be employed; however, care must be taken to avoid excess breakdown in the structure of the catalyst. It may, in some cases, be desirable to effect the drying in the presence of an inert gas such as nitrogen, etc. If reduction of the catalyst material is necessary or desirable, it may be effected in any of the customary manners by use of a reducing gas such as hydrogen, a hydrogen-containing mixture, a paraffin hydrocarbon, etc., at a suitable reducing temperature, preferably not greater than about 850° C.

Many of the metal compounds which are desired as catalytically active constituents of the compound catalysts, such as the oxides, sulphides, selenides, etc., are not sufficiently water soluble to permit direct impregnation of the activated alumina with aqueous solutions of them. In such cases, the activated alumina may be impregnated with an aqueous solution of a sufficiently soluble selected metal salt which can be converted, subsequent to the impregnation, to the desired metal oxide or metal sulphide, for example, by calcination or hydrogen sulphide treatment, respectively, of the impregnated material. The compound catalysts comprising an activated alumina and another active metal oxide also may be prepared conveniently by precipitating the corresponding metal hydroxide on the surface of activated alumina and subjecting the thus obtained material to calcination under suitable temperature conditions. A compound catalyst consisting of an activated alumina and a metal incorporated in the surface of the activated alumina may be prepared by depositing the metal hydroxide or oxide on the activated alumina as above-described and then subjecting the material to treatment with a reducing gas under reducing conditions. The above-described modes of preparing the catalysts are by suitable modifications readily adaptable to the preparation of catalysts consisting of an activated alumina and a plurality of active metals and/or active metal compounds. For example, a compound catalyst consisting of an activated alumina, chromium oxide and ferric oxide, with the latter two compounds incorporated in the surface of the activated alumina, may be prepared by impregnating the activated alumina with an aqueous solution containing chromic acid and ferric nitrate, and subjecting the impregnated material to calcination to convert the deposited ferric nitrate to ferric oxide. A catalyst consisting of an activated alumina, sodium bichromate and ferric oxide may, for example, be prepared by impregnating the activated alumina with an aqueous solution of ferric nitrate, drying and calcining the impregnated material to convert the deposited ferric nitrate to ferric oxide, impregnating the calcined material with an aqueous solution of sodium bichromate, and finally drying the resulting catalyst under suitable temperature conditions.

The great activity, stability and resistance to poisoning of the catalyst over a wide temperature range permits of their employment in a wide variety of chemical processes over long periods of time. When used at high temperatures in the execution of catalytic reactions involving an organic compound or compounds, the catalysts may, after having been in use for some time, gradually lose activity. In the absence of specific catalyst poisons, loss of activity of the catalyst is, in many cases, and particularly when the catalyst is used to effect dehydrogenation, apparently due to deposition of carbon on the surface thereof. In such cases, the original activity of the catalyst can usually be restored by treating it with an oxidizing agent under such conditions that the deposited carbon is oxidized and removed therefrom without any substantial breakdown of the structure of the catalyst.

The catalyst may usually be revivified without removing it from the reaction tube or chamber in which the catalytic reaction is effected. The reactivation may be accomplished by passing oxygen, air or some other gaseous material containing a substantial amount of free oxygen into contact with the catalyst while maintaining the temperature at from about 200° C. to about 850° C. When the catalyst has been used in a dehydrogenation process, it is preferably reactivated at about the same temperature at which the dehydrogenation was effected, that is, at a temperature usually in the range of from about 350° C. to about 850° C. If desired, the reactivation may be effected in the presence of an added inert material as steam, carbon dioxide, nitrogen, hydrogen and the like. For example, in some cases mixtures of air and steam are suitable. In other cases, steam and carbon dioxide, alone or in admixture, are suitable reactivating agents. During the reactivation, temperatures greater than 850° C. are usually to be avoided since their use may cause undesired changes in the structure of the catalyst and permanently affect its activity. After combustion of the carbon on the catalyst has started, the temperature of the catalyst mass can be controlled, at least in part, by regulating the flow of the air or other gaseous oxidizing agent. The time of treatment required to reactivate the catalyst will depend upon various factors such as the particular oxidizing agent employed, the conditions of the reactivation treatment, and the amount of carbon to be oxidized. The reactivation can, in many cases, be effected in less than one hour.

The utilization periods of the catalyst will vary depending upon the particular catalyst, the process in which it is employed, the conditions of execution of the process in which it is employed, the permissible decrease in activity, etc. In practice, representative catalysts have been used continuously for several days and longer between reactivation treatments. In some cases, as when catalysts comprising chromic oxide are reactivated, it may be desirable to follow the oxidation treatment by treatment with hydrogen or some other suitable reducing agent. The oxidation treatment of a chromic oxide-containing catalyst may result in oxidation of the chromic oxide ($Cr_2O_3$) to chromium trioxide ($CrO_3$), which, although unstable at high temperatures, is stabilized by reaction with the activated alumina to form aluminum chromate. The reduction treatment apparently regenerates the chromic oxide and/or some other oxide of chromium.

Prior to their use, particularly in a dehydrogenation or hydrogenation process, the catalysts, as originally prepared or before being reused after reactivation, may be treated with the required activating agent such as water vapor, hydrogen sulphide, hydrogen selenide, hydrogen telluride; and the like or mixtures of the same.

The following list of representative catalytic operations in which the catalysts of the invention may be effectively used is not intended to be limitative but merely to illustrate the general usefulness of the novel catalyst compositions.

The catalysts may be used to catalyze the oxidation of inorganic and organic compounds. For example, they may be employed in processes wherein hydrocarbons are oxidized to oxy-compounds as alcohols, aldehydes, ketones, carboxylic acids, etc., in processes wherein alcohols are oxidized to aldehydes and ketones, in processes wherein halohydrins are oxidized to haloacids, and the like.

The catalysts may be employed in reduction processes which may or may not involve the fixation of hydrogen to the product. For example, in the reduction of benzyl alcohol to toluene, in the reduction of phenol to benzene, in the reduction of furfuryl alcohol to methyl furfurane, in the reduction of nitrogen oxides and nitro-compounds to ammonia, the reduction of nitrous acid esters, oximes and amides to amines, the reduction of carbon oxides to methanol, methane and higher hydrocarbons, etc.

The catalysts may be employed in dehydration and dealcoholation processes. For example, they may be used as agents to effect the dehydration of alcohols to olefines, to effect the splitting out of water or an alcohol from ethers, and to effect like reactions.

The catalysts of the invention are also useful as halogenation catalysts, as catalysts in the field of inorganic synthesis, as catalysts in the water gas process, and as agents for use in the catalytic purification of gases.

The catalysts of the invention are particularly suitable as dehydrogenation and hydrogenation catalysts. They are very effective dehydrogenation catalysts and are of particular value when used for this purpose. While of general usefulness in any process wherein it is desired to dehydrogenate a dehydrogenatable organic compound to a product containing the same number of carbon atoms but fewer hydrogen atoms, the catalysts of the invention are of particular value in that their use provides a practical and economical process for the technical scale conversion of paraffin hydrocarbons containing at least two carbon atoms, such as are contained in or derived from petroleum and petroleum products, to the corresponding commercially valuable olefines and diolefines.

Numerous catalysts have been proposed for accelerating the dehydrogenation reaction in attempts to bring the catalytic dehydrogenation of paraffin hydrocarbons to the corresponding olefines within the field of practical utility. The proposed catalysts, mainly metals and metal oxides, have been used per se and deposited on various inert supports and carriers. The proposed catalysts and catalyst compositions are inherently unsatisfactory in one or more respects. No one of them combines in itself all of the characteristics which we have found to be essential requisites of a good dehydrogenation catalyst. Many of the known dehydrogenation catalysts are unsuitable because they are too active. Even when mounted on the conventional inactive carriers and supports, some of the known catalysts are so active that their use requires the use of prohibitively low temperatures if cracking is to be avoided.

Some catalysts and catalyst compositions which are suitable from the standpoint of initial activity have been proposed. Many of these less active catalysts are unsuitable because of inherent physical characteristics or because of difficulties in preparing them in an active and sufficiently stable form. For example, some of the metal compound catalysts have the requisite degree of activity but they cannot be prepared in a physical form in which they have the desired surface characteristics and stability under the optimum conditions of their use. The catalytically active gels, such as chromium oxide gel, are representative catalysts which are unsuitable because of their instability and rapid loss of activity at temperatures at which their use is practicable. Chromium oxide gel is a selective dehydrogenation catalyst at temperatures of about 400° C. However, at this temperature, the equilibrium is unfavorable and the conversions per pass are prohibitively low. Attempts to obtain a more favorable equilibrium by operating at higher temperatures result in rapid loss of activity due to breakdown of the physical structure of the catalyst material.

Investigation of numerous elements and compounds has led us to the conclusion that the suitability of a material as a dehydrogenation catalyst depends upon its chemical constitution, its physical structure and its surface characteristics. A material which has the requisite surface characteristics to which we refer in this specification is sometimes spoken of as possessing "ultra-porosity". These desirable surface characteristics manifest themselves by imparting to the material possessing them an adsorption capacity for gases and vapors. Thus, for each catalyst of the same chemical composition, there is a definite parallelism between its activity as a dehydrogenation catalyst and its adsorption capacity for gases and vapors, and a material which has no adsorption capacity is in general devoid of catalytic activity. A material to be a good dehydrogenation catalyst which has a high degree of activity over prolonged periods of time at the optimum temperature for its use must possess, besides a dehydrogenation inducing chemical constitution, a stable physical structure and "ultra-porosity" which it retains at the high temperatures at which it functions efficiently as a dehydrogenation catalyst. We found that many metal compounds, which from theoretical considerations should be active in inducing dehydrogenation, were incapable of use for this purpose because they could not be obtained in a form in which they had the stability, physical structure and surface characteristics requisite to a good dehydrogenation catalyst. Slight modifications in the mode and materials of preparation of particular catalytic materials, by influencing the physical structure and surface characteristics of the product, materially affected their activity and usefulness as dehydrogenation catalysts. These considerations directed our efforts to the discovery of a material having the requisite stability, physical structure and surface characteristics which could be readily combined with materials having the desired dehydrogenation inducing activity so as to result in a compound catalyst having the desired features of all of its constituents and combining in itself the chemical constitution, stability, physical structure and surface characteristics of the ideal dehydrogenation catalyst.

This investigation has culminated in the discovery of the novel catalysts of this invention.

An activated alumina is in itself, under specfic operation conditions, a dehydrogenation catalyst, its use for this purpose being claimed in a copending application, Serial No. 31,450, filed July 15, 1935, which matured into U. S. Patent No. 2,182,431 on December 5, 1939. An activated alumina has the stability, physical structure and surface characteristics desired in a dehydrogenation catalyst. It has, however some undesirable characteristics dependent upon its chemical constitution which render it less suitable as a dehydrogenation catalyst than the compound catalysts of the present invention. Some of the specific characteristics of an activated alumina per se as a catalyst for the dehydrogenation of isobutane are: An activated alumina appears to have its maximum activity at a temperature of about 600° C. As the temperature is progressively increased above 600° C., the selective dehydrogenation activity decreases and, when a temperature of about 800° C. is reached, the material breaks down with almost complete loss of activity. As the temperature is decreased from 600° C. the activity of the activated alumina decreases rapidly; it is in some cases almost entirely inactive at temperatures of 550° C. An activated alumina when used per se as a dehydrogenation shows a rather long induction period (as long as 6 hours in some cases). An activated alumina is quite sensitive to the presence of water vapor in the treated material. Concentrations of water vapor up to about 0.01% by volume in the feed appear to be essential to practical activity of an activated alumina catalyst, but the presence of water in a much greater amount may have a deleterious effect and materially decrease activity.

When catalytically active metals and metal compounds are combined with an activated alumina by incorporation in the surface thereof, the resulting compound catalyst possesses the desired modified activity of the metal or metal compound combined with the desired stability, physical structure and surface characteristics of the activated alumina. The added metal or metal compound imparts to the compound catalysts the desired catalytic activity, while the undesired catalytic effects of the activated alumina per se are to a certain extent obscured. Thus, certain disadvantages inherent in the use of an activated alumina per se as a dehydrogenation catalyst are not in evidence when the catalysts of the invention are employed for the same purpose. For example, many of the catalysts of the invention are active dehydrogenation catalysts at temperatures as low at 350° C.; they may be efficiently used at relatively much higher space velocities; they reach their maximum activity with a relatively much shorter induction period; they are much less sensitive to the presence of water vapor; and they retain their activity and stability at temperatures of 850° C. and higher.

In many cases, the activated alumina has a definite stabilizing effect on the catalytically active metal compound which is incorporated in its surface to result in the compound catalyst. For example, chromium oxide in the form of a gel is unstable at temperatures above 400° C., although it has its optimum practicable activity at such higher temperatures. A catalyst consisting of an activated alumina with a substantial but lesser amount of a chromium oxide incorporated in the surface thereof is an excellent dehydrogenation catalyst which may be used at temperatures as high as 850° C. with substantially no breakdown of structure or loss of activity.

Some metals and metal compounds are such active dehydrogenation catalysts that their use, even at relatively low temperatures, results in excessive decomposition. The combination of such excessively active materials with an activated alumina to result in the compound catalysts herein described modifies their activity, and the resulting catalyst has the desired activity at higher temperatures at which more favorable equilibria can be obtained with substantially no undesirable decomposition.

The following examples, which are not intended to be limitative, describe representative novel catalysts of the class herein described and claimed, and preferred modes of preparing and reactivating such catalysts.

*Example I*

The following table lists representative novel activated alumina-containing catalysts prepared in accordance with the process of the invention by impregnating an activated alumina, in the form of about 8 to 10 mesh granules, with an aqueous solution of a metal compound or derivative of a metal compound which it is desired to incorporate in the surface of the activated alumina, separating the impregnated material, drying the separated material and subjecting it to further treatment such as calcination, reduction, etc., if necessary, to obtain the desired catalyst. The table indicates the particular catalyst, the amount of the active element contained therein, and the nature and concentration of the solution used for impregnation of the activated alumina.

| Catalyst | Percent active element | Impregnating solution |
|---|---|---|
| Activated alumina—$CrO_3$ | 15.20 Cr | Concentrated solution of $CrO_3$. |
| Activated alumina—$CrO_3$ | 0.15 Cr | 0.04 M solution of $CrO_3$. |
| Activated alumina—$CrO_3$ | 0.57 Cr | 0.15 M solution of $CrO_3$. |
| Activated alumina—$CrO_3$ | 1.18 Cr | 1.20 M solution of $CrO_3$. |
| Activated alumina—$CrO_3$ | 1.98 Cr | 0.64 M solution of $CrO_3$. |
| Activated alumina—$CrO_3$ | 3.72 Cr | 1.50 M solution of $CrO_3$. |
| Activated alumina—$Cr_2O_3$ | 0.67 Cr | 0.50 M solution of $Cr(NO_3)_3$. |
| Activated alumina—$CrCl_3$ | 1.40 Cr | 1.00 M solution of $CrCl_3$. |
| Activated alumina—$Na_2Cr_2O_7$ | 1.60 Cr | 0.50 M solution of $Na_2Cr_2O_7$. |
| Activated alumina—$Na_2Cr_2O_7$ | 2.55 Cr | 0.50 M solution of $Na_2Cr_2O_7$. |
| Activated alumina—$Na_2Cr_2O_7$ | 2.76 Cr | 0.50 M solution of $Na_2Cr_2O_7$ |
| Activated alumina—$K_2CrO_4$ | 1.82 Cr | 1.00 M solution of $K_2CrO_4$. |
| Activated alumina—$K_2Cr_2O_7$ | 2.90 Cr | 0.50 M solution of $K_2Cr_2O_7$. |
| Activated alumina—$Cr_2(SO_4)_3$ | 2.50 Cr | 0.50 M solution of $Cr_2(SO_4)_3$. |
| Activated alumina—$CrO_3$ | 11.10 Cr | Concentrated solution of $CrO_3$. |
| Activated alumina—$CrO_3$ | 18.20 Cr | Concentrated solution of $CrO_3$. |
| Activated alumina—$K_2Cr_2O_7$ | 2.65 Cr | 0.50 M solution of $K_2Cr_2O_7$. |
| Activated alumina—$Na_2Cr_2O_7$ | 5.90 Cr | 1.50 M solution of $Na_2Cr_2O_7$. |
| Activated alumina—$Cr_2(CrO_4)_3$ | Cr | Concentrated solution of $Cr_2(CrO_4)_3$. |
| Activated alumina—$Na_2MnO_4$ | 1.40 Mn | 1.00 M solution of $Na_2MnO_4$. |
| Activated alumina—$(VO)_2(SO_4)_3$ | 1.50 V | 0.50 M solution of $(VO)_2(SO_4)_3$. |
| Activated alumina—Ti-K oxide | 2.70 Ti | 1.00 M solution of $TiK(COOH)_2$ |

All of the above-listed catalysts were tested and found to be satisfactory catalysts for effecting the dehydrogenation of organic compounds, particularly the paraffin hydrocarbons. For example, the catalysts were employed to effect the dehydrogenation of isobutane to isobutylene. The isobutane vapors were passed, at a space velocity of from about 150 to about 2000, into contact with the catalysts maintained at temperatures of from about 350° C. to 650° C. Maximum conversions as high as 60% were obtained on one passage of the isobutane through the catalyst tube. After being in continuous use for a considerable period of time, the catalysts suffered a loss of activity, probably due to the deposition of carbon on the surface thereof. The catalysts were reactivated to substantially their original activity by passing air, at the rate of about 500 cc. to about 1000 cc./minute, over them while they were maintained at about the temperature at which they were employed in the dehydrogenation process.

*Example II*

A compound activated alumina-chromium oxide catalyst containing about 6% of chromium oxide (calculated as Cr₂O₃) was prepared by submerging granules of an activated alumina in a concentrated chromic acid solution, alternately boiling and cooling the solution, and separating and drying the resulting solid material. The catalyst was found to be suitable for inducing many chemical reactions, and it was particularly suitable as a hydrogenation-dehydrogenation catalyst.

*Example III*

An activated alumina-chromium oxide catalyst was prepared in the following manner: An activated alumina (8 to 14 mesh granules) was heated at a temperature of about 300° C. and under a subatmospheric pressure for about 1 hour. The activated alumina was allowed to cool to about room temperature and, while still under reduced pressure, it was immersed in a concentrated aqueous solution of chromic acid. After being allowed to stand for a few minutes, the solid material was separated and dried. The dried material was packed in a quartz tube and heated to a temperature of about 550° C. while a reducing gas was passed over it to convert the CrO₃ to Cr₂O₃. When the reduction was complete, the catalyst mass contained about 17% Cr₂O₃.

The catalyst was found to be an excellent dehydrogenation catalyst. The catalyst mass was maintained at a temperature of about 575° C. while propane was passed into contact with it at a space velocity of from about 1200 to about 1500. The average conversion over 4 hours of continuous operation was about 30%.

After 4 hours of continuous operation, the catalyst was reactivated and its initial activity substantially restored by passing air over it at a space velocity of from about 600 to 720 and a temperature of about 580° C. for about 1 hour.

While we have described our invention in a detailed manner and provided specific examples describing representative catalysts and modes of preparing and regenerating the same, it is to be understood that modifications may be made and that no limitations other than those imposed by the scope of the appended claims are intended.

This application is a continuation-in-part of our copending application, Serial No. 18,386, filed April 26, 1935, which issued as U. S. Patent No. 2,184,234 on December 19, 1939.

We claim as our invention:

1. A solid dehydrogenation catalyst which consists of a chromium oxide and an activated alumina possessing the physical structure and surface characteristics of the "activated alumina" of commerce, the chromium oxide being incorporated in the surface of granules of the activated alumina and representing about 0.5% to about 10% of the weight of the catalyst mass.

2. A solid catalyst for dehydrogenation and hydrogenation reactions which consists of a chromium oxide and an activated alumina possessing the physical structure and surface characteristic of the "activated alumina" of commerce, the chromium oxide being incorporated in the surface of the activated alumina and representing about 0.5% to about 40% by weight of the catalyst mass.

3. A solid catalyst for dehydrogenation and hydrogenation reactions which consists of a chromium compound and an activated alumina possessing the physical structure and surface characteristics of the "activated alumina" of commerce, the chromium compound being incorporated in the surface of the activated alumina and representing about 0.5% to about 40% by weight of the catalyst mass.

4. A solid catalyst material which consists of a chromium compound and an activated alumina possessing the physical structure and surface characteristics of the "activated alumina" of commerce, the chromium compound being present in substantial but lesser amount than the activated alumina and incorporated in the surface of the activated alumina.

5. A solid dehydrogenation catalyst which consists of a compound of a metal of the first transition series of the periodic table having an atomic number less than twenty-six and an activated alumina possessing the physical structure and surface characteristics of the "activated alumina" of commerce, the transition series metal compound being incorporated in the surface of the activated alumina and representing about 0.5% to about 10% by weight of the catalyst mass.

6. A solid catalyst material which consists of at least one compound of a metal of the first transition series of the periodic table having an atomic number less than twenty-six and an activated alumina possessing the physical structure and surface characteristics of the "activated alumina" of commerce, the transition series metal compound being present in substantial but lesser amount than the activated alumina and incorporated in the surface of the activated alumina.

7. A solid catalyst material which consists of at least one metal of the first transition series of the periodic table having an atomic number less than twenty-six and an activated alumina possessing the physical structure and surface characteristics of the "activated alumina" of commerce, the transition series metal being present in substantial but lesser amount than the activated alumina and incorporated in the surface of the activated alumina.

8. A solid catalyst material which consists of a vanadium compound and an activated alumina possessing the physical structure and surface characteristics of the "activated alumina" of commerce, the vanadium compound being present in substantial but lesser amount than the activated alumina and incorporated in the surface of the activated alumina.

9. A solid catalyst material which consists of a titanium compound and an activated alumina possessing the physical structure and surface characteristics of the "activated alumina" of commerce, the titanium compound being present in substantial but lesser amount than the activated alumina and incorporated in the surface of the activated alumina.

HERBERT P. A. GROLL.
JAMES BURGIN.

DISCLAIMER 2,270,165.—*Herbert P. A. Groll*, Berkeley, and *James Burgin*, Oakland, Calif. CATALYST. Patent dated January 13, 1942. Disclaimer filed December 30, 1943, by the assignee, *Shell Development Company*.

Hereby disclaims the following—

Page 1, left hand column, lines 52 and 53, the passage reading "and 2,015,593 each";

Page 2, left hand column, line 50, the passage reading "$FeO—Cr_2O_3$,";

Page 3, left hand column, lines 52 to 71, the passage reading "For example, a compound catalyst consisting of an activated alumina, chromium oxide and ferric oxide, with the latter two compounds incorporated in the surface of the activated alumina, may be prepared by impregnating the activated alumina with an aqueous solution containing chromic acid and ferric nitrate, and subjecting the impregnated material to calcination to convert the deposited ferric nitrate to ferric oxide. A catalyst consisting of an activated alumina, sodium bichromate and ferric oxide may, for example, be prepared by impregnating the activated alumina with an aqueous solution of ferric nitrate, drying and calcining the impregnated material to convert the deposited ferric nitrate to ferric oxide, impregnating the calcined material with an aqueous solution of sodium bichromate, and finally drying the resulting catalyst under suitable temperature conditions."

[*Official Gazette February 1, 1944.*]